United States Patent
Miller et al.

(10) Patent No.: US 10,780,374 B2
(45) Date of Patent: Sep. 22, 2020

(54) ANIMAL BYPRODUCT RECOVERY SYSTEM

(71) Applicant: AIR AND LIQUID SYSTEMS, INC., Rochester Hills, MI (US)

(72) Inventors: James E. Miller, Troy, MI (US); Gordon T. Urquhart, Birmingham, MI (US)

(73) Assignee: AIR & LIQUID SYSTEMS INC., Rochester Hills, MI (US)

( * ) Notice: Subject to any disclaimer, the term of this patent is extended or adjusted under 35 U.S.C. 154(b) by 330 days.

(21) Appl. No.: 15/757,116

(22) PCT Filed: Dec. 13, 2017

(86) PCT No.: PCT/US2017/066027
§ 371 (c)(1),
(2) Date: Mar. 2, 2018

(87) PCT Pub. No.: WO2018/112004
PCT Pub. Date: Jun. 21, 2018

(65) Prior Publication Data
US 2020/0188815 A1 Jun. 18, 2020

Related U.S. Application Data

(60) Provisional application No. 62/505,214, filed on May 12, 2017, provisional application No. 62/433,615, filed on Dec. 13, 2016.

(51) Int. Cl.
*B01D 21/24* (2006.01)
*B01D 21/00* (2006.01)
(Continued)

(52) U.S. Cl.
CPC ..... *B01D 21/0084* (2013.01); *B01D 17/0205* (2013.01); *B01D 21/2438* (2013.01);
(Continued)

(58) Field of Classification Search
CPC .................................................. B01D 21/0084
See application file for complete search history.

(56) References Cited

U.S. PATENT DOCUMENTS 2,281,590 A 5/1942 Newton
2,779,731 A 1/1957 Kelly et al.
(Continued)

OTHER PUBLICATIONS

International Search Report for International Application No. PCT/US2017/066027, Filed Dec. 13, 2017.
(Continued)

*Primary Examiner* — Peter Keyworth
(74) *Attorney, Agent, or Firm* — Gregory L. Ozga; Warn Partners, P.C.

(57) ABSTRACT

A system for recovery of animal byproducts and providing water reuse from an animal processing plant waste stream. In one embodiment of the invention there is an equalization tank forming part of an animal processing plant that is mechanically filtered to recover animal byproducts from a water mixture in the equalization tank. In another aspect of the invention there is a skimmer tank that contains a skimmer mixture with water and animal byproducts. The system mechanically separates the animal byproducts from the skimmer mixture in a manner that is suitable for human consumption. The system also allows the separated water to be reused in the animal processing plant.

8 Claims, 9 Drawing Sheets

(51) Int. Cl.
    *B01D 17/02*     (2006.01)
    *C02F 1/40*     (2006.01)
    *C02F 103/22*     (2006.01)
    *C02F 1/24*     (2006.01)

(52) U.S. Cl.
    CPC ............ *B01D 21/2488* (2013.01); *C02F 1/24* (2013.01); *C02F 1/40* (2013.01); *C02F 2103/22* (2013.01); *C02F 2209/03* (2013.01); *C02F 2301/046* (2013.01)

(56) References Cited

U.S. PATENT DOCUMENTS

| | | | |
|---|---|---|---|
| 4,267,038 A | 5/1981 | Thompson | |
| 4,282,256 A | 8/1981 | Evich et al. | |
| 4,340,487 A | 7/1982 | Lyon | |
| 4,668,391 A | 5/1987 | Ottens | |
| 4,722,791 A | 2/1988 | Turnquist | |
| 4,933,087 A | 6/1990 | Markham, Jr. et al. | |
| 5,156,745 A | 10/1992 | Cairo, Jr. et al. | |
| 5,200,085 A | 4/1993 | Rudolf et al. | |
| 5,372,711 A | 12/1994 | Sill | |
| 5,496,469 A | 3/1996 | Scraggs et al. | |
| 5,514,266 A | 5/1996 | O'Brien et al. | |
| 5,540,836 A | 7/1996 | Coyne | |
| 5,620,594 A * | 4/1997 | Smith | B01D 21/0012 210/167.3 |
| 5,656,173 A | 8/1997 | Jordan et al. | |
| 5,658,462 A | 8/1997 | Hopkins et al. | |
| 5,980,754 A | 11/1999 | Hopkins et al. | |
| 6,761,820 B2 | 7/2004 | Miller | |
| 6,802,984 B1 | 10/2004 | Perkins et al. | |
| 6,946,080 B2 | 9/2005 | Perkins et al. | |
| 7,000,333 B2 | 2/2006 | Yarem | |
| 7,767,085 B2 | 8/2010 | Urquhart et al. | |
| 8,277,652 B2 | 10/2012 | Urquhart et al. | |
| 9,167,843 B2 | 10/2015 | Garwood | |
| 2002/0096472 A1 | 7/2002 | Smith et al. | |
| 2005/0218074 A1 * | 10/2005 | Pollock | C02F 3/1273 210/637 |
| 2008/0190834 A1 | 8/2008 | Urquhart et al. | |
| 2010/0213110 A1 * | 8/2010 | Urquhart | B01D 21/0012 210/151 |
| 2011/0120955 A1 | 5/2011 | Wood | |
| 2014/0116967 A1 * | 5/2014 | Smith | C02F 1/52 210/804 |

OTHER PUBLICATIONS

GHD PTY Limited, Assessment of Hydrocyclones for Fat Removal from Meat Processing Wastewater Streams, Oct. 2003, PRENV.022, Meat & Livestock Australia Limited, Australia.

* cited by examiner

ANIMAL BYPRODUCT RECOVERY SYSTEM

FIELD OF THE INVENTION

The present invention is directed to a system for recovery of animal byproducts in a protein or animal processing plant.

BACKGROUND OF THE INVENTION

In protein or animal rendering and processing plants it is desirable to make use of as much of the animal as possible and reduce or eliminate waste from the process. When protein or animals are processed portions are removed that are considered suitable for human consumption, while other portions of the animal are used for other purposes such as making food for other animals or other goods.

Regarding portions and processes producing products not suitable for human consumption, one example is dog and cat food. In a processing plant there are waste streams that contain a significant amount of nutrition that is not always recovered. One particular waste stream comprises processing plant water used to wash and clean the animal at various stations within the processing plant. Animal byproducts such as blood, fat, skin, bone and meat particles are mixed with and wash away with the water as a waste stream and are not recovered. However if the waste stream were treated according to the teachings of the present invention, the water mixture of these waste streams contain a great deal of fats and proteins that can be recovered. It is therefore desirable to provide additional systems that allow for the recovery of animal byproducts, which can then be used to provide additional nutrition. One particular example is that pet food can then be enhanced with the protein or fats recovered from the waste stream, thereby providing a better pet food product.

It is also desirable to conserve or reuse water and to capture animal byproducts that will be suitable for human consumption, particularly in the downstream process stations where the dressed animal or animal parts are placed in a chilled water skimmer tank for a period of time. During such processes a lot of water is chilled to a desirable temperature and then used to wash the animal, thereby washing away a lot of animal byproducts. Filtering and reusing the water saves energy in the form of water and cooling energy as well as allowing the filtration of animal byproducts such as fats and proteins, which can be used for human consumption. It is desirable to provide a solution for removing the animal byproducts using mechanical processes and to conserve resources, such as fresh water and energy for cooling the water in the system.

SUMMARY OF THE INVENTION

One embodiment of the present invention is directed to a system for recovery of animal byproducts from an animal processing plant waste stream. In one embodiment of the invention there is an equalization tank forming part of an animal processing plant that is connected to one or more water mixture sources. The equalization tank includes first section, a second section and a separation wall separating the first section and second section with an aeration screen located at the top side of the separation wall. There is an inlet of the equalization tank that inputs a water mixture containing particles of animal byproduct, which is supplied to the first portion of the equalization tank. As the level of the water mixture reaches the top of the separation wall a portion of the water mixture will flow over the top of the separation wall and passed through the aeration screen and flow into the second section of the equalization tank.

Within the second section of the equalization tank there is a moving autoweir capable of moving vertically within the second section so that a body portion of the moving autoweir stays about at a surface level of the water mixture, in order to collect and remove a portion of the water mixture and particles of animal byproduct that are less dense than water, which is more concentrated at the surface level of the water mixture within the second section.

The moving autoweir has one or more inlet doors formed in the body of the moving autoweir that will open when positioned at or above the surface level of the water mixture within the second section and will close when positioned below the surface level of the water mixture within the second section. There is a suction outlet connected to the body of the moving autoweir for removing the water mixture that enters the body of the moving autoweir through the one or more inlet doors.

A vertical separation tank having an inlet connected to and receiving the water mixture from the suction outlet. The vertical separation tank has one or more aeration inlets connected to the separation tank at locations beneath the surface of the mixture contained within the separation tank, wherein the one or more aeration inlets apply a steady stream of air bubbles to the water mixture in order to promote the separation of particles of animal byproduct that are less dense than water, by promoting the floatation of particles of animal byproduct that are less dense than water to float to the surface of the water mixture. This results in a surface layer of concentrated animal byproduct mixture at the surface of the water mixture. The vertical separation tank also includes a scraper having one or more blades located above the surface of the water mixture within the separation tank that push the concentrated animal byproduct mixture with water to a sludge chute. The concentrated animal byproduct that is pushed into the sludge chute is then move to a holding tank for receiving the concentrated animal byproduct mixture with water from the sludge chute.

BRIEF DESCRIPTION OF THE DRAWINGS

The present invention will become more fully understood from the detailed description and the accompanying drawings, wherein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
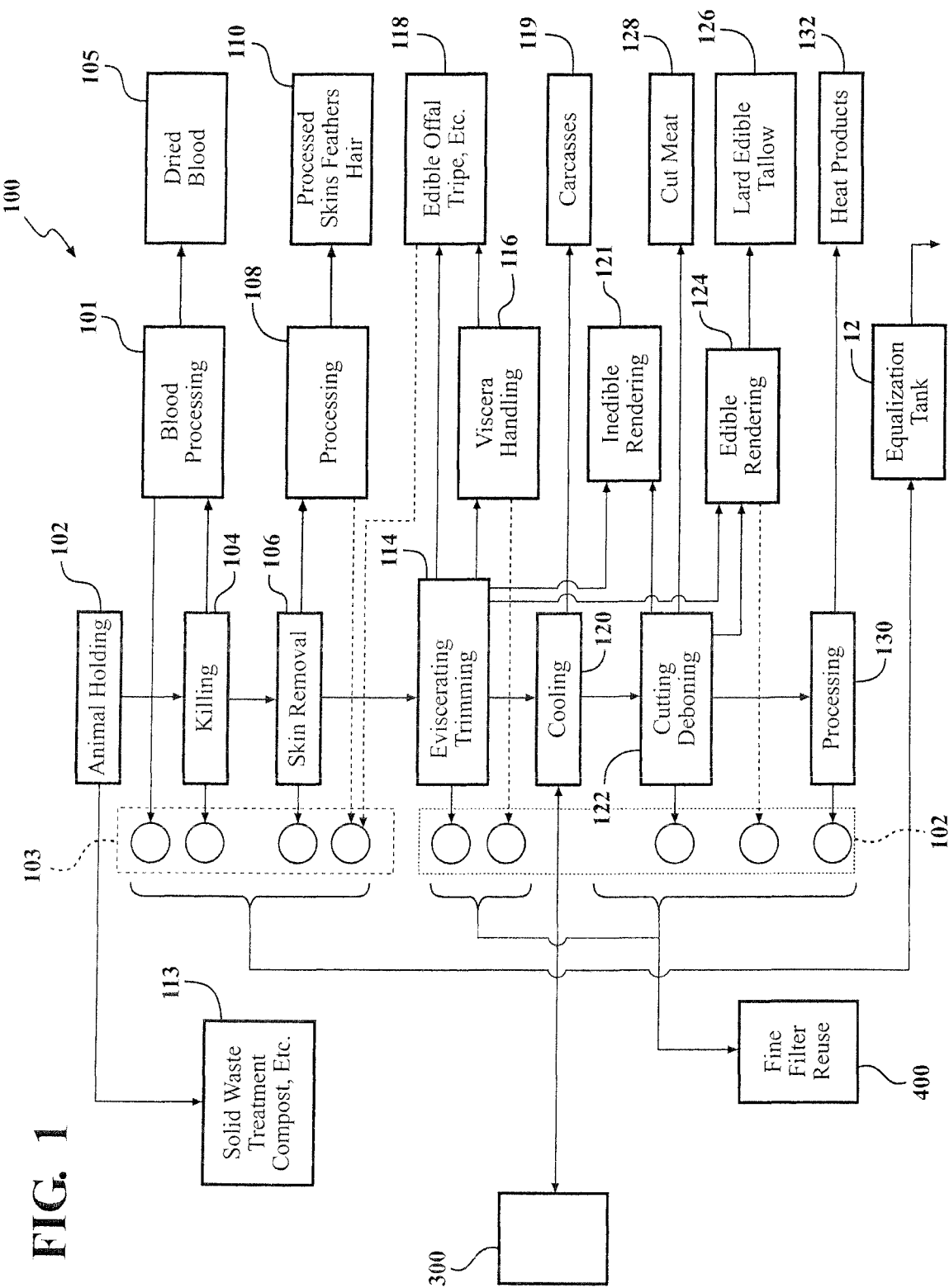
FIG. 1 is an overview diagram of an animal rendering and processing plant.

The present invention is directed to a system for the recovery of protein and fat from animal processing plant waste stream. The present invention is also directed to recovering protein and fat from animal processing plant water reuse streams in an animal processing plant. FIG. 1 shows a schematic view of processing plant 100, which is generally applicable to any type of meat processing plants used for rendering any type of animal, including but not limited to cattle, hogs, poultry, lamb, fish and wild game. Regarding the different types of waste and liquid mixtures in the processing plant 100, there are four areas that the embodiments of the present invention will address, which are mixtures in an equalization tank 12, sumps 103, sumps 102, 103, chiller reuse system 300 and a fine filter reuse system 400.

At most stations in the animal rendering plant water is used to wash and clean the animal and work areas during processing, which creates what is referred to herein as a mixture. The mixture is generally defined as water with one or more of the following parts of the animal including blood, fats, protein, hair, feathers, bone, fat, cartilage, muscle, skin and parts of organs. The amount or size of the parts can vary depending on where in the animal rendering plant 100 the mixture is coming from. This will also cause variances in the type of system used to filter the mixture, as will be discussed in greater detail below. As shown in FIG. 1 there is an animal holding area 102, where animals are held prior to entering the processing stream. At times the animals in the animal holding area 102 generate solid and liquid waste (i.e., urine and manure), which is handled at a solid waste treatment compost station 113 that collects the solid and liquid waste for further processing as fertilizer.

Next at killing station 104 the animal is killed using customary industry practices. Depending on the type of animal being processed, this station might be optional. For example with fish or wild game the animal may have already been killed and sometimes eviscerated prior to arrival. At the killing station 104, water is used to wash the animal and blood is collected for a blood processing station 101 where the collected blood is processed into a dried blood 105 product. After the killing station 102, the animal is moved to a skin removal station 106 where the skin, scales, hair, feathers or hide of the animal is removed. This is also an optional station because in some processes the skin of the animal is left in place and not removed. The skin, feathers, hair or other usable products that are removed at station 106 is removed to a processing station 108 where it is cleaned and made into processed skins, feathers or hair 110 such as leather hides, feathers, hair fillers etc.

At the blood processing station 101, killing station 104, skin removal station 106, processing station 108 and a production of edible offal and trip station 118 (which will be described below), water is used continuously to wash away various parts thereby creating a mixture that flow into various drains leading to sumps 103 which can be individual sumps at each station or one large sump depending on the setup of the plant 100. The mixture collected at the sumps 103 is transferred to the equalization tank 12 that serves the purpose of controlling the flow because of the amount of water coming from different parts of the plant 100 will vary greatly depending on the processes and events occurring throughout the plant 100. For example operations at the killing station 104 and processing station 108 can stop or pause, while the skin removal station 106 will continue or speed up, thereby changing the amount of mixture flowing to the equalization tank 12.

After the skin removal station 106 there is a washing, eviscerating and trimming station 114 were the body of the animal is washed down and then the organs and other pieces of the animal such as fat, cartilage, etc. are removed and sent to a viscera handling station 114. At station 114 some of the removed parts become edible offal, tripe etc. 118 while other parts removed at station 114 go to an inedible rendering station 121.

After the washing, eviscerating and trimming station 114 the animal is moved to a cooling station 120 that is part of a chiller reuse system 300. At the cooling station 120 the carcass of the animal is cooled in chilled water to lower the temperature and remove some of the smaller fat particles. If desired the carcass 119 is removed and packaged for sale. An example would be a whole fryer chicken or turkey. Next at a cutting and deboning station 122 the carcass of the animal is cut into cut meat 128 and the bones are removed (if desired). At this station portions of meat and bones are produced and moved to the edible rendering station 124 which leads to the production of lard and edible tallow 126. Also after the cutting and deboning station 122 some of the meat goes onto a processing station 130 and undergoes different processes resulting in various types of meat products 132 being produced such as, but not limited to ground, cured, pickled, smoked, cooked and canned meats. At the washing, eviscerating and trimming station 114, viscera handling station 116, cutting and deboning station 122, edible rendering station 124, inedible rendering station 121, edible rendering station 124 and processing station 130, water is used for washing down the animal and processing areas resulting in a mixture that includes water and fine particles of fat, bone, blood, meat etc. The water from these stations is collected and processed in a fine filter reuse system 400 that will be discussed in greater detail below.

Figure 2:
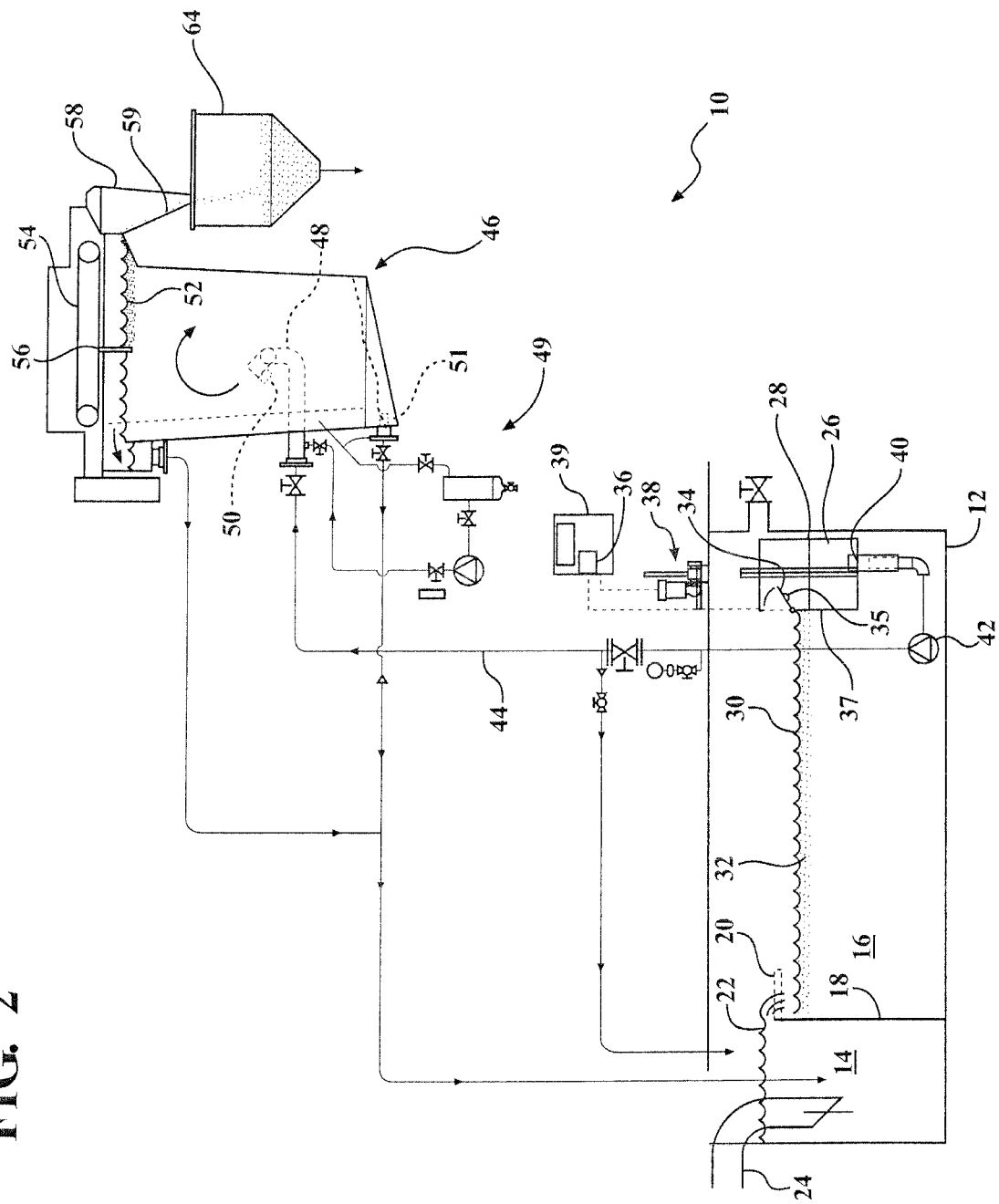
FIG. 2 is a schematic view of an animal recovery system.

FIG. 2 shows a schematic view of an animal byproduct recovery system 10 according to one aspect of the present invention. The animal byproduct recovery system 10 allows for the recovery of animal byproducts from a protein or animal rendering plant waste stream present in the equalization tank 12 that forms part of the protein or animal rendering plant connected to one or more sources of water mixture as explained above with reference to FIG. 1. However it is within the scope of this invention for the invention to be utilized at other locations shown in FIG. 1. The equalization tank 12 has a first section 14 and a second section 16 as well as a separating wall 18 that separates the first section 14 and second section 16. The first section 14 serves as an energy break zone to slow current of the mixture entering the equalization tank 12. There is an aeration screen 20 located at a top side 22 of the separation wall 18. An inlet 24 of the equalization tank 12 inputs the water mixture collected from the sumps 103 and other stations located throughout the plant 10 that allow the water mixture to flow into the first section 14 of the equalization tank 12. As the level of the water mixture reaches the top of the separation wall 18 a portion of the water mixture will flow over the top 22 of the separation wall 18 and passed through the aeration screen 20 and flow into the second section 16 of the equalization tank 12.

Within the second section 16 of the equalization tank 12 there is a moving autoweir 26. The moving autoweir 26 is capable of moving vertically within the second section 16 so that a body 28 portion of the moving autoweir 26 stays about at a surface level 30 of the water mixture within the second section 16 in order to collect and remove a portion of the water mixture and particles of animal byproduct that are less dense than the water and form a surface layer 32, which are more concentrated at the surface level 30 of the mixture within the second section 16. The body 28 of the moving autoweir 26 has one or more inlet doors 34 that will open when positioned at or slightly above the surface level 32 of the water mixture within the second section 16 and will close when positioned below the surface level 30 of the water mixture within the second section 16. Each of the inlet doors 34 has a float portion 35 that controls the opening and closing of the respective inlet door by floating on the surface level 30 of the mixture.

The moving autoweir 26 further includes a hydrostatic pressure sensor 36 including an air tube with a first end 37 connected to the outside surface of the moving autoweir 26. The first end 37 is positioned in the water mixture and a second end 35 is connected to an air source and hydrostatic pressure sensor 36. The hydrostatic pressure sensor 36 determines the position of the first end 37 of the air tube relative to the surface level of the water mixture, which allows for the location of the inlet doors 34 relative to the surface level 30 of the mixture to be known. Knowing the location of the of the one or more doors is important to make sure that the moving autoweir 26 is operating at maximum capacity and is positioned at the surface where there is the highest concentration of particles of animal byproduct are less dense than water. The vertical height of the body 28 is controlled by a motor actuator 38 connected to the body 28 of the autoweir 26, that also supplies compressed air to the compressed air line 37. The motor actuator 38 and measurement data measured by the hydrostatic pressure sensors 36 is analyzed and controlled by a control unit 39. The motor actuator 38 can include a pulley, worm drive, gear track or other suitable mechanism to adjust the height of the body of the autoweir 26. The body 28 of the moving autoweir 26 further includes a suction outlet 40 connected to the body 28 for removing the mixture that enters the body 28 through the one or more inlet doors 34.

The suction outlet 40 is connected to a pump 42 via a supply line 44 that leads to a vertical separation tank 46 with an inlet 48 connected to and receiving the mixture from the suction outlet 40 of the moving autoweir 26. Connected to the supply line 44 before the inlet 48 is a dissolved gas flotation arrangement 49 that injects ambient air using a pump into the supply line to create microbubbles in the mixture entering the inlet 48. The pump of the dissolved gas floatation is specialized in that it is able to operate in a cavitated state, thereby shearing ambient air into the mixture in the supply line 44, which creates smaller bubbles than those achieved using compressed air. The small size of the microbubbles will better attach to and promote floating with smaller particles of animal byproduct which will float to the top of the vertical separation tank 46. The present embodiment of the invention seeks to remove animal byproducts without the use of chemicals such as peracetic acid or other peroxides, however, in some applications a minimal amount of chemicals might be necessary or desirable. The dissolved gas floatation arrangement 49 is one possible location where chemicals could be added since the concentration of animal byproduct in the vertical separation unit 46 is much higher than in the equalization tank 12. Also since the volume of mixture in the vertical separation tank 46 is lower than in the equalization tank 12 a lower amount of chemicals would be used.

Additionally the vertical separation tank 46 includes one or more aeration inlets, and in the example shown has an upper aeration inlet 50 and a lower aeration inlet 51 connected to the vertical separation tank 46 at locations beneath the surface of the mixture contained within the vertical separation tank 46. The upper aeration inlet 50 and lower aeration inlet 51 are selectively operated and can be individually controlled thereby allowing an operator to inject compressed air at different times and locations. The lower aeration inlet 51 is used to mix any solids at the bottom of the vertical separation tank 46. The upper aeration inlet 50 promotes floatation of animal byproducts by providing larger bubbles that attach to particles of animal byproducts. Also the bubbles from the upper aeration inlet 50 move up one side of the vertical separation tank and create a current within the mixture of the vertical separation tank 46 that moves the floating animal byproducts at the surface toward a sludge chute 58.

The vertical separation tank 46 also includes a scraper 54 having one or more blades 56 located above the surface of the water mixture within the separation tank 46. The one or more blades 56 move parallel to the surface of the water mixture in order to push a concentrated animal byproduct mixture 59 with water to the sludge chute 58. A holding tank 64 is connected to and receives concentrated animal byproduct mixture 59 from the sludge chute 58, where the concentrated animal byproduct is stored until needed for additional processing. The holding tank 64 is not heated, however in some applications it might be desirable provide a heated holding tank.

Figure 3:
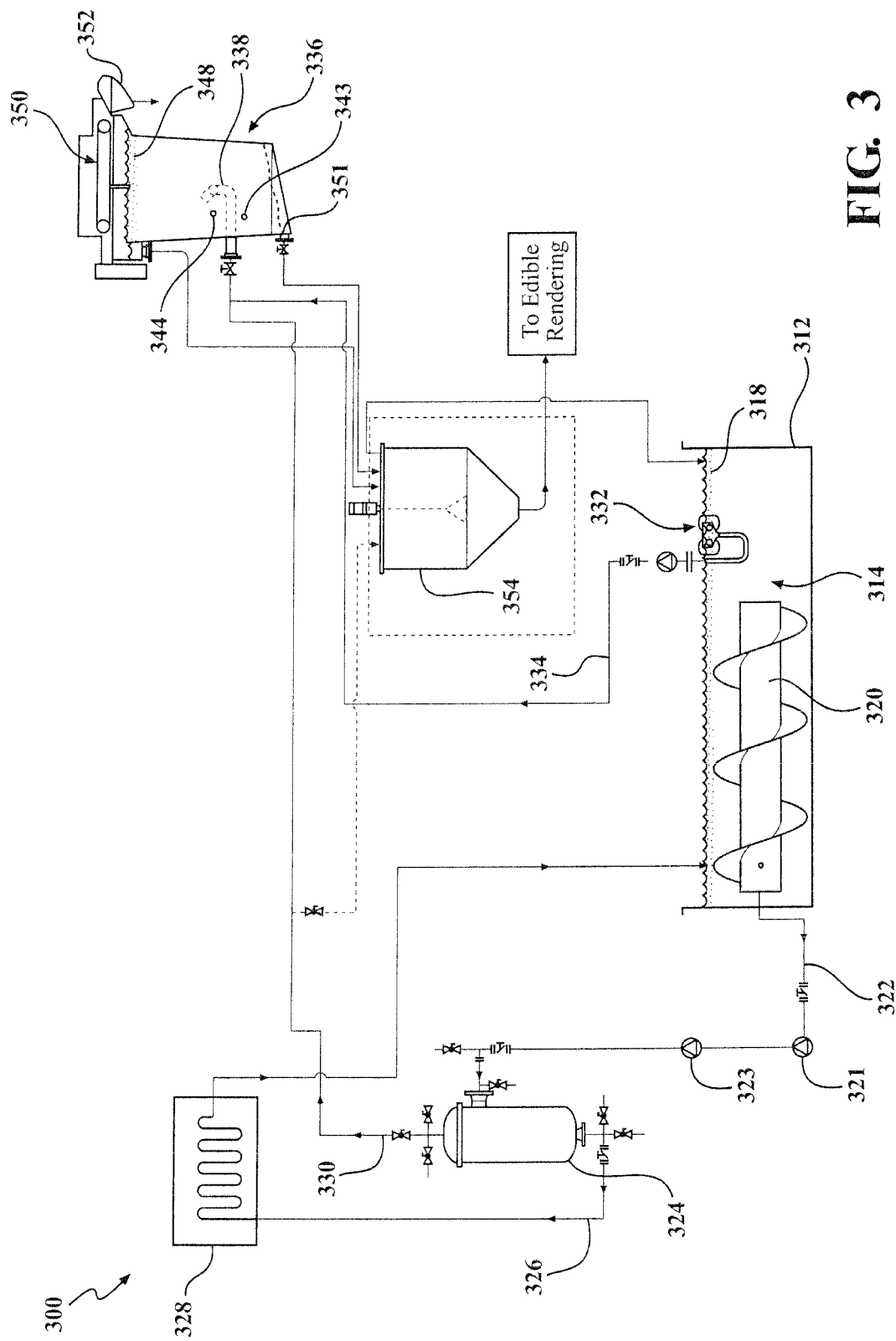
FIG. 3 is a schematic view of a chiller reuse system.

Referring now to FIG. 3 there is a schematic diagram of a chiller reuse system 300 used at the cooling station 120 shown in FIG. 1. The chiller reuse system 300 includes a skimmer tank 312 containing a skimmer mixture 314 which includes water and a layer 318 of animal byproducts with a density less than the water. The animal byproducts layer 318 primarily consists of nonpolar lipids, such as fats cartilage skin etc. Within the skimmer tank 312 is a rotary screen 320 that rotates within the skimmer tank 312 and is connected to a main outlet of the skimmer tank 312. The rotary screen 320 has a screw shaped screen with holes that rotates the carcasses contained in the skimmer tank 312, agitates the skimmer mixture 314 and screens out solid particles in the skimmer mixture 314 to create a screened skimmer mixture 322 of water and animal byproducts that pass through the main outlet. The screened skimmer mixture 322 contains more water than animal byproducts and the animal byproducts present in the screened skimmer mixture are smaller than the holes in the rotary screen 320. The screened skimmer mixture is pumped through a conduit using a main pump 321, which can optionally be coupled to a booster pump 323 that can be used to increase flow through the chiller reuse system 300 if the pressure needs to be increased for a liquid separator 324 located downstream.

The skimmer mixture 322 is inputted to the liquid-liquid separator 324, which is a hydro-cyclone or array of hydro-cyclones having an inlet connected to the main outlet of the skimmer tank 312. The liquid-liquid separator 324 separates the skimmer mixture 322 and creates filtered reuse water 326 that has more water than animal byproducts, which is then passed through a chiller 328 and recirculated back to the skimmer tank 312. The chiller 328 uses a cooling source, such as a processing plant cooling source to cool the filtered reuse water, since the skimmer mixture 322 in many applications is required to be at a cooled temperature. The liquid-liquid separator 324 also creates a cyclone mixture 330 which has more animal byproducts than water provided that there is enough animal byproduct in the skimmer mixture 322. The cyclone mixture 330 exits through a cyclone outlet.

Within the skimmer tank 312 there is also optionally one or more skimmer tank removal devices such as a floating weir 332 or stationary weir (similar to the stationary weir described in FIG. 2) located near the surface of the skimmer tank 312. The use of the floating weir 332 or stationary weir in this chiller reuse system 300 is considered optional and it is contemplated that some embodiments will not utilize the floating weir 332 or a stationary weir. The operation and details of the floating weir 332 are described below in reference to FIG. 8A and FIG. 8B. The floating weir 332 has an inlet for receiving a portion of the layer of animal byproducts and some of the water from the skimmer tank 312 becoming what is referred to as a weir mixture 334. Within the vertical separation tank 336 there are one or more aeration inlets connected to the vertical separation tank 336 at locations beneath the surface of the vertical separation tank mixture. The one or more aeration inlets that include a lower aeration inlet 343 and upper aeration inlet 344 that apply a steady stream of air bubbles to the vertical separation tank mixture and promote the separation of particles of animal byproduct, that are less dense than water, to float on the surface of the vertical separation tank mixture contained within the vertical separation tank 336. The upper aeration inlet 344 and lower aeration inlet 343 are connected to the vertical separation tank 336 at locations beneath the surface of the vertical separation tank mixture contained within the vertical separation tank 346. The upper aeration inlet 344 and lower aeration inlet 343 are selectively operated and can be individually controlled thereby allowing an operator to inject compressed air at different times and locations. The lower aeration inlet 343 is used to mix any solids at the bottom of the vertical separation tank 336. The upper aeration inlet 344 promotes floatation of animal byproducts by providing larger bubbles that attach to particles of animal byproducts. Also the bubbles from the upper aeration inlet 344 move up one side of the vertical separation tank and create a current within the mixture of the vertical separation tank 343, that moves the floating animal byproducts at the surface toward a sludge chute 352. The end result is that a surface layer 348 of concentrated animal byproduct mixture is formed above the water of the vertical separation tank mixture. A scraper 350 that has one or more blades located above the surface of the vertical separation mixture within the vertical separation tank 336. The one or more blades move parallel to the surface in order to push the animal by-product floating on the surface of the vertical separation tank 336 to the sludge chute 352. A collection tank 354 receives the animal byproduct from the sludge chute 352 where the animal byproduct is held for further processing such as being incorporated into the edible rendering station 124 show in FIG. 1 or some other processes. Additionally at the bottom of the vertical separation tank 336 a layer of solid animal byproducts can form. A drain 351 is provided in the form of a valve that allows the solid layer to be removed from the bottom of the vertical separation tank 336, which is then drained directly to the collection tank 354 for further processing.

The present embodiment of the invention seeks to remove animal byproducts without the use of chemicals such as peracetic acid or other peroxides, however, in some applications a minimal amount of chemicals might be necessary or desirable. In certain applications the rotary screen 320 in the skimmer tank 312 might begin to get blocked with large particles of animal by product. Therefore it can sometimes be necessary to add chemical to the mixture in the skimmer tank, which would also help prevent blockages or reduce cleaning in the chiller 328 or liquid liquid separators 324. However, in the event that chemicals are used, the amount needed would be reduced because of the ability of the mechanical separation components in the chiller reuse system 300 to be able to remove the animal byproducts.

Figure 4:
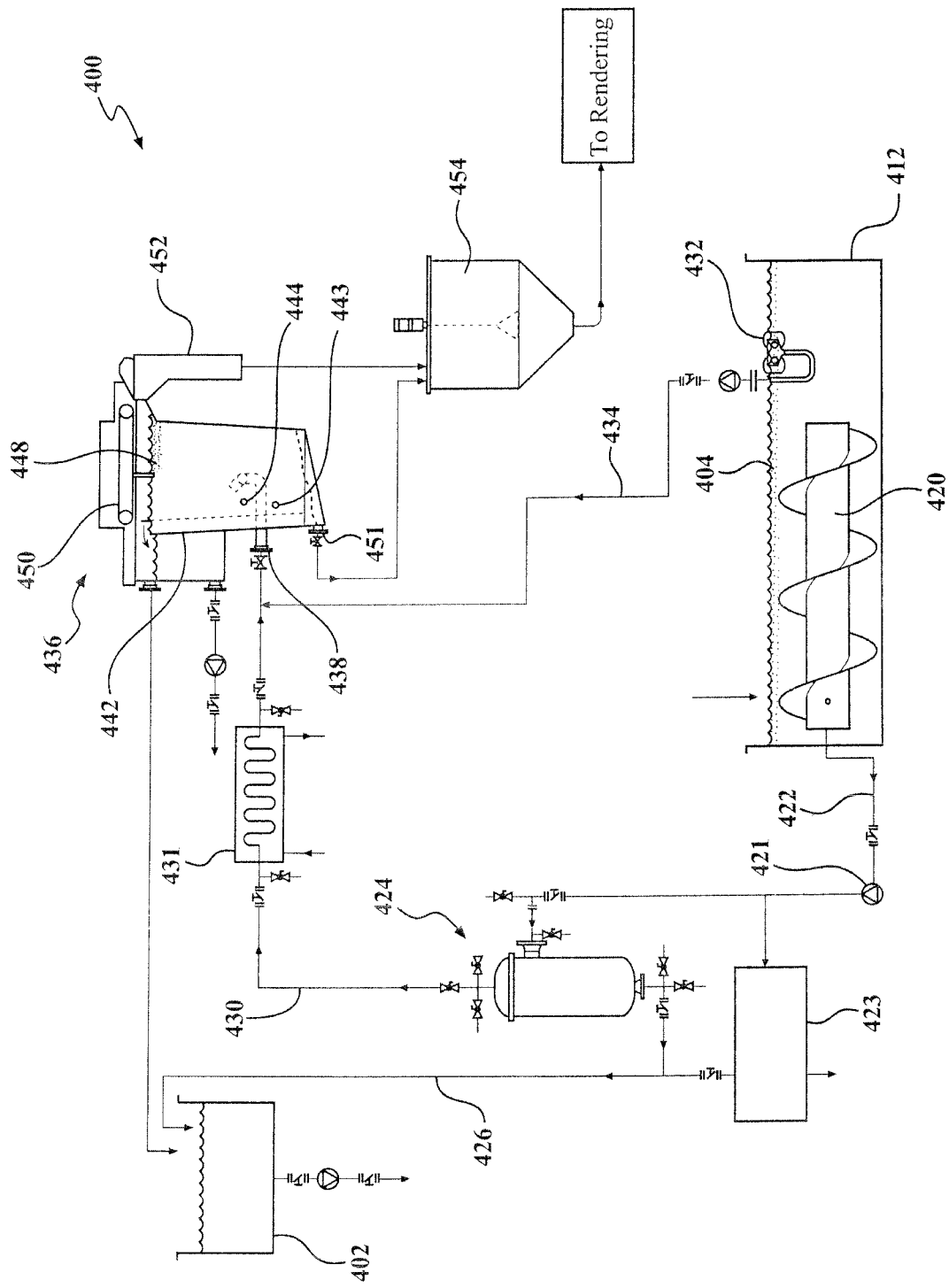
FIG. 4 is a schematic view of a fine filter reuse system.

Referring now to FIG. 4 the details of the fine filter reuse system 400 is shown and has a fine filter tank 412 having a mixture containing a layer 404 of animal byproducts floating at the surface of the mixture. The mixture contains animal byproducts that are generally smaller in size than the general particle size of the animal byproducts contained in the equalization tank 12 in the embodiment of FIG. 2. The temperature of the mixture in the fine filter tank 412 is typically room temperature or slightly chilled if the mixture is derived from wash water used during the later process station in the animal processing plant 100 shown in FIG. 1. A rotary screen 420 rotates within the fine filter tank 412 and is connected to a main outlet of the fine filter tank 412. The rotary screen 420 can have a screw rotary shaped screen with holes and agitates the mixture contained in the fine filter tank 412 to screen out solid particles in the mixture to create a screened fine filter mixture 422 of water and animal byproducts that pass through the main outlet. The screened fine filter mixture 422 contains more water than animal byproducts and the animal byproducts present in the fine filter mixture are smaller than the holes in the rotary screen 420. The screened fine filter mixture is pumped through a conduit using a main pump 421 and can be routed to waste treatment 423 in the event that the level of animal by product is too great or if equipment downstream is undergoing maintenance. The screened fine filter mixture 422 is also routed to a liquid liquid separator 424 located downstream.

The fine filter mixture 422 is inputted to the liquid-liquid separator 424, which is a hydro-cyclone or array of hydro-cyclones having an inlet connected to the main outlet of the skimmer tank. The liquid-liquid separator 424 separates the fine filter mixture 422 and creates filtered reuse water 426 that is moved to an equalization tank 402 where the reuse water can then be reintroduced back into the plant 100 wash water at various stations in the plant 100. Also the filtered reuse water can selectively be directed to waste treatment 423. While in the equalization tank 402 the reuse water can be treated with chemicals such a peracetic acid or peroxide, if desired.

Figure 5:
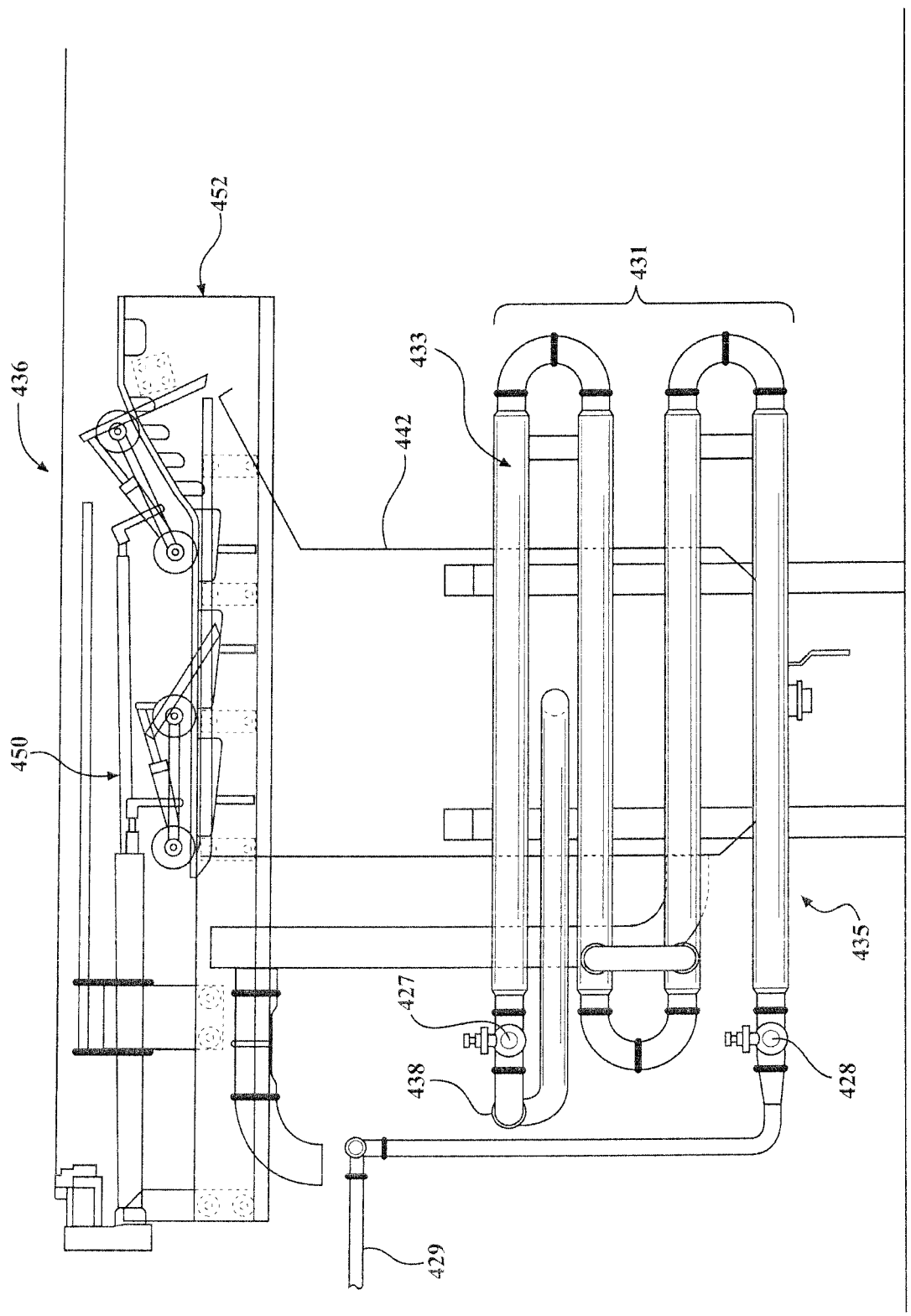
FIG. 5 is a side plan view of a vertical separation tank.

The liquid-liquid separator 424 also creates a cyclone mixture 430 which may have more animal byproduct than water, provided enough animal byproduct is present in the equalization tank 402 exiting through a cyclone outlet. The cyclone mixture passes through a heat exchanger 431 where it is cooled. Referring also to FIG. 5 the heat exchanger 431 is shown integrated with the vertical separation tank 436 for use in the fine filter reuse system 400. The vertical separation tank 436 has an inlet 438 that receives the hydrocyclone mixture from the heat exchanger 431 and optionally receives the weir mixture 434 (see FIG. 4). The heat exchanger 431 shown in FIG. 5 is connected to the body 442 of the vertical separation tank 436. The heat exchanger 431 has a hydrocyclone mixture inlet 429 that receives the hydrocyclone mixture, which passes through a cooling jacket 433 that cools the hydrocyclone mixture flowing through the cooling jacket between the hydrocyclone mixture inlet 429 and the inlet 438 of the vertical separation tank 436. The cooling jacket 433 has a cooling inlet 428 that receives coolant from a coolant source such as a chilling tower in the plant or chilled water from another plant process or even an independent chilled water circuit for the fine filter reuse system 400. The coolant received at the coolant inlet 428 flows through the cooling jacket 433 to a coolant outlet 427. The heat exchanger 431 can be a separate unit or as shown in FIG. 5 it can be incorporated or integrated with the body 442 of the vertical separation tank 436. The heat exchanger 431 cools the vertical separation tank mixture, which promotes the separation and coagulation of animal by-product from the water.

Within the fine filter tank 412 there is also optionally one or more fine filter removal devices such as a floating weir 432 or stationary weir (similar to the stationary weir described in FIG. 2) located near the surface of the skimmer tank 412. The use of the floating weir 432 or stationary weir is considered optional and it is contemplated that some embodiments will not utilize the floating weir 432 or a stationary weir. The floating weir 432 has an inlet for receiving a portion of the layer of animal byproducts and some of the water from the fine filter tank 412 as what is referred to as a weir mixture 434. The weir mixture 434 is pumped to the vertical separation tank 436 having an inlet 438 connected to and receiving the weir mixture 434 and the hydrocyclone mixture 430, hereafter referred to as the vertical separation tank mixture. The inlet 438 feeds into a body 442 of the vertical separation tank 436. Within the vertical separation tank 436 there are one or more aeration inlets that include a lower aeration inlet 443 and an upper aeration inlet 444 connected to the vertical separation tank 436 at locations beneath the surface of the vertical separation tank mixture, which apply a steady stream of air bubbles to the vertical separation tank mixture to promote the separation of particles of animal byproduct that are less dense than water so that the particles float to the surface of the vertical separation tank mixture contained within the vertical separation tank 436. The upper aeration inlet 444 and lower aeration inlet 443 are selectively operated and can be individually controlled thereby allowing an operator to inject compressed air at different times and locations. The lower aeration inlet 443 is used to mix any solids at the bottom of the vertical separation tank 436. The upper aeration inlet 444 promotes floatation of animal byproducts by providing larger bubbles that attach to particles of animal byproducts. Also the bubbles from the upper aeration inlet 444 move up one side of the vertical separation tank and create a current within the mixture of the vertical separation tank 443 that moves the floating animal byproducts at the surface toward a sludge chute 452.

A scraper 450 has one or more blades located above the surface of the vertical separation mixture within the vertical separation tank 436. The one or more blades move parallel to the surface in order to push the animal by-product floating on the surface of the vertical separation tank 436 to the sludge chute 452. A collection tank 454 receives the animal byproduct from the outlet 452 where the animal byproduct is held for further processing such as being incorporated into the edible rendering station 124 show in FIG. 1 or some other processes. Additionally at the bottom of the vertical separation tank 436 a layer of solid animal byproducts can form. A drain 451 is provided in the form of a valve that allow the solid layer to be removed from the bottom of the vertical separation tank 436, which is then drained directly to the collection tank 453 for further processing.

The present embodiment of the invention seeks to remove animal byproducts without the use of chemicals such as peracetic acid or other peroxides, however, in some applications a minimal amount of chemicals might be necessary or desirable. In certain applications the rotary screen 420 in the fine filter tank 412 might begin to get blocked with large particles of animal by product. Therefore it can sometimes be necessary to add chemical to the mixture in the fine filter tank 412, which would also help prevent blockages or reduce cleaning in the heat exchanger 431 or liquid liquid separators 424. However, in the event that chemicals are used, the amount needed would be reduced because of the ability of the mechanical separation components in the fine filter reuse system 400 to be able to remove the animal byproducts.

Figure 6A:
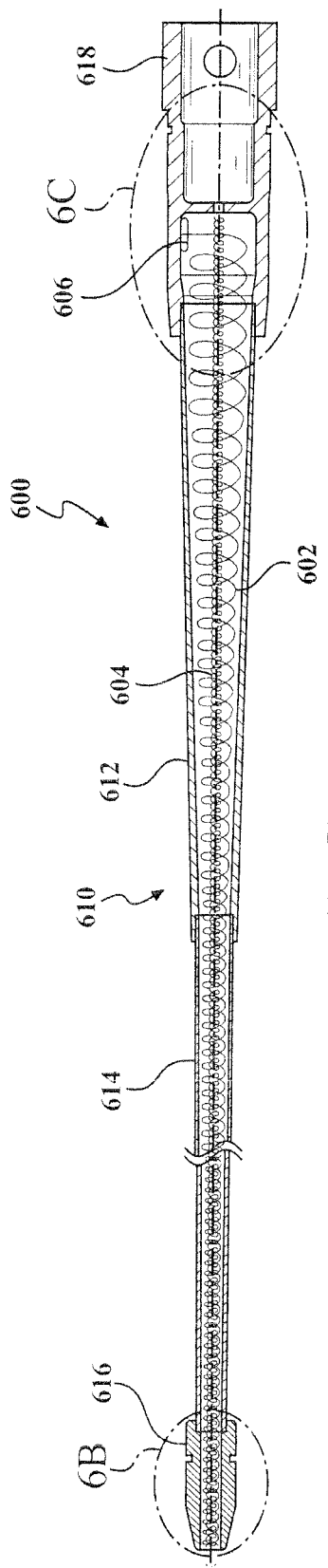
FIG. 6A is a cross-sectional side view of a hydrocyclone.
Figure 6C:
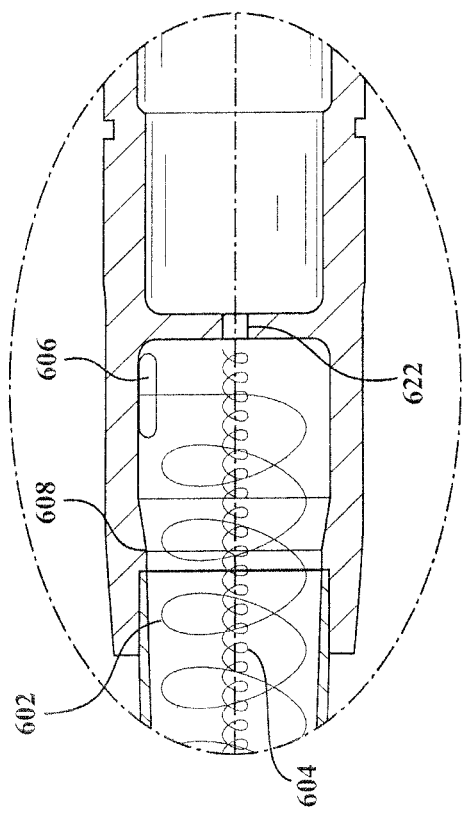
FIG. 6C is an enlarged cross-sectional side view of the inlet and vortex finder portions of the hydrocyclone.
Figure 6B:
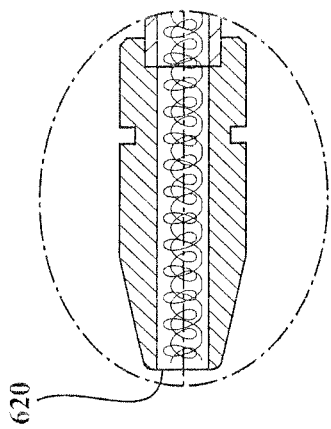
FIG. 6B is an enlarged cross-sectional side view of an apex portion of the hydrocyclone.

Referring now to FIGS. 6A, 6B and 6C there is a cross-sectional side view showing the details of a hydrocyclone 600 that forms part of the liquid liquid separators described in the various embodiments of the invention herein. Each liquid liquid separator will have one or more hydrocyclones depending on a particular application. Each hydrocyclone 600 has a primary vortex region 602 and a secondary vortex region 604. The collar piece 618 that includes an inlet volute 606 that leads to a vortex finder 608 located just adjacent the primary vortex region 602. The primary vortex region 602 is defined by a segmented body 610 connected and adjacent the vortex finder 608.

The segmented body 610 includes multiple sections that are connected together either by press fit or by some attachment mechanism such as threads or adhesives. Providing the segmented body 610 allows the hydrocyclone 600 to be taken apart for cleaning. As shown the segmented body 610 has a first piece 612 connected at one end to the collar piece 618 and a second piece 614 connected to the first piece 612 at an opposite end. The second piece 614 has an apex 616 connected at an end opposite the end connected to the first piece 612. The apex 616 has a first outlet 620 of a fixed diameter. The apex 616 can be interchanged with other apexes having outlets with different diameters. Selection of the appropriate apex is made depending on the specific gravity of the mixture being filtered by the hydrocyclone 600. The collar piece 618 contains the inlet volute 606, vortex finder 608 and a second outlet 622.

Mixture entering the inlet volute 606 flows downward through the primary vortex region 602 in a spiral path to a first outlet 620 where a clean water is removed out the first outlet 620. A secondary vortex forms in a secondary vortex region 604 that begins at or near the first outlet 620 and flows back toward the collar piece 618. The secondary vortex contains the less dense animal byproducts such as fat particles, which exit a second outlet 622 formed in the collar piece 618.

Figure 7:
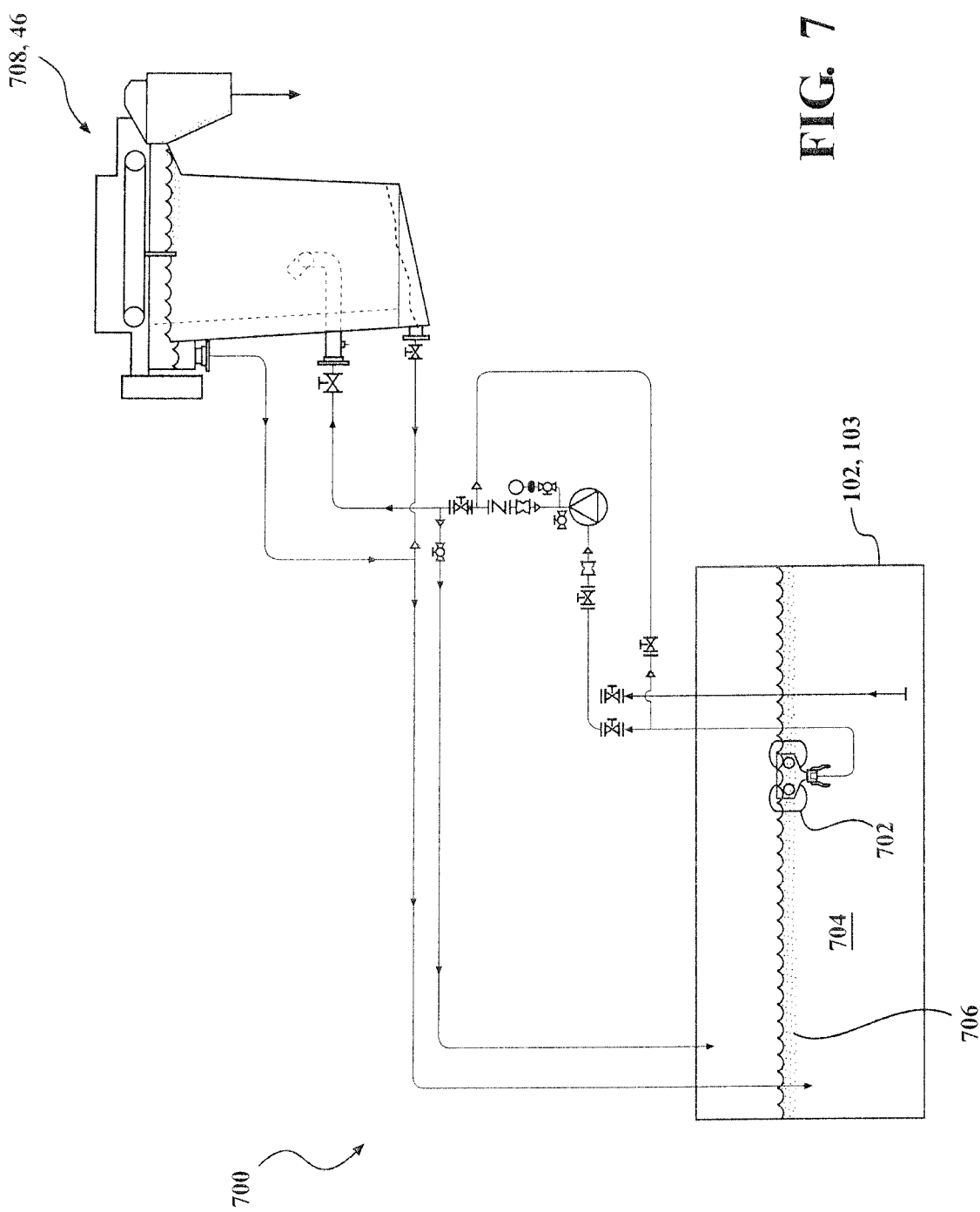
FIG. 7 is a schematic diagram of a sump mixture treatment system.

Referring back to FIG. 1 and to FIG. 7 another alternate embodiment of the invention is shown. Between the equalization tank 12 and the fine filter reuse system 400 are sumps 103 that collect the mixture prior to allowing it to flow to the equalization tank 12 and sumps 102 that collect the mixture prior to allowing it to flow to the fine filter reuse system 400. Each sump 102, 103 serves to catch large solid particles prior to moving downstream and causing blockages. The present embodiment of the invention depicts a sump mixture treatment system 700, which includes placing a floating weir 702 at each sump 102, 103 to filter the mixture prior to flowing to the equalization tank 12 or fine filter reuse system 400. Within the sump 102, 103 is a sump mixture 704 which is contains water and floating animal byproducts 706. The floating weir 702 sucks the animal byproducts 706 off the surface of the sump mixture 704 and sends it to a vertical separation tank 708, which can be separate from or the same vertical separation tank 46 shown in FIG. 2.

Use of the floating weir 702 provides more level control which is necessary since the amount of mixture in the sump 112 can vary greatly, however, the need to continuously skim the animal by-product is necessary to prevent blockages downstream. The floating weir 702 eliminates any issues of not having enough liquid to supply to the system which can result in cavitation of the pump, which could happen if a stationary weir were used. Additionally this type of system would allow for the easier re-location or if a user anticipates moving the system to various locations in order to find the "best" location within their facilities. Also this type of system is smaller and would reduce the overall installation costs that would normally be incurred for larger systems.

Figure 8A:
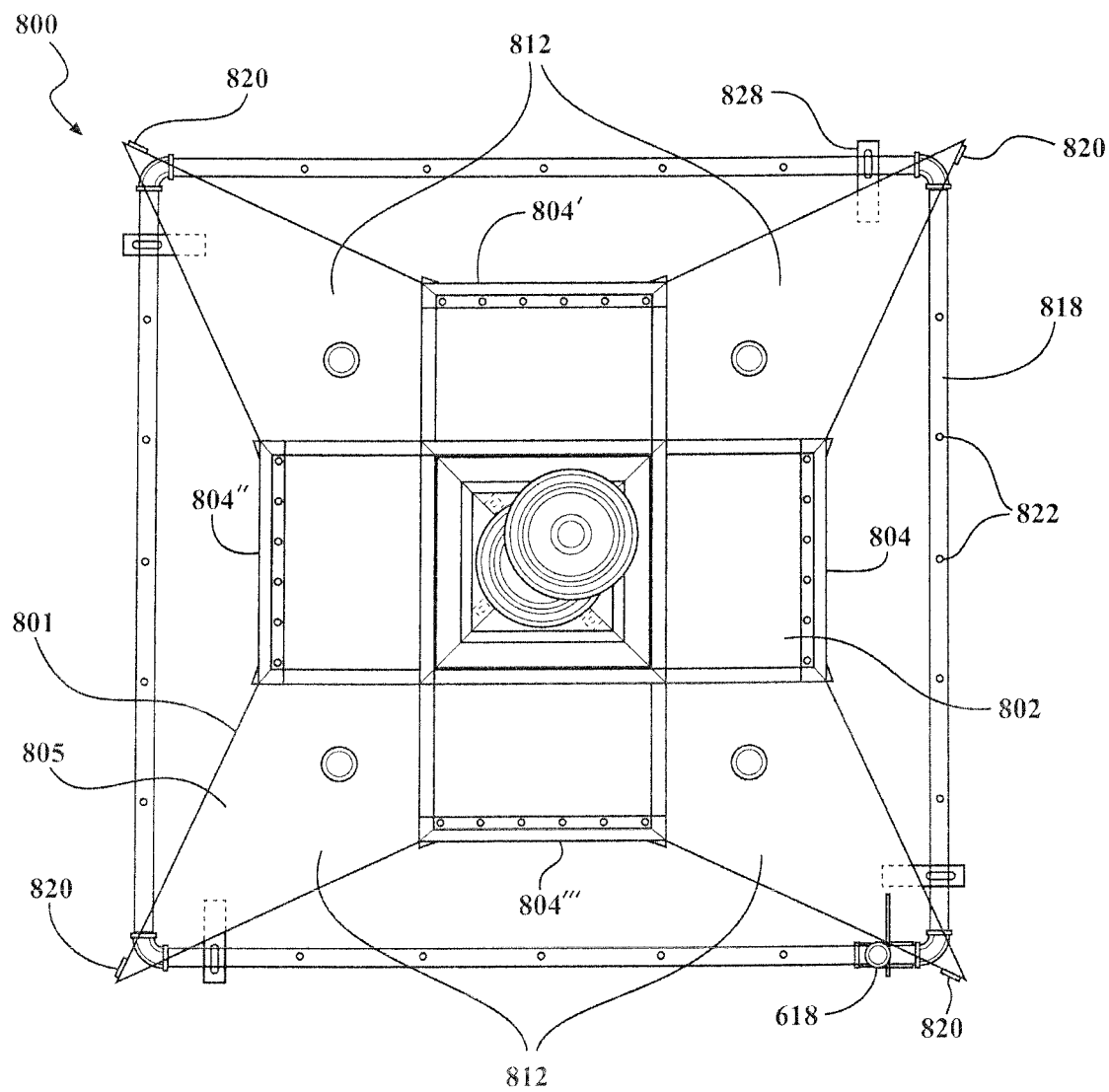
FIG. 8A is an overhead plan view of the floating weir in accordance with another embodiment of the invention.
Figure 8B:
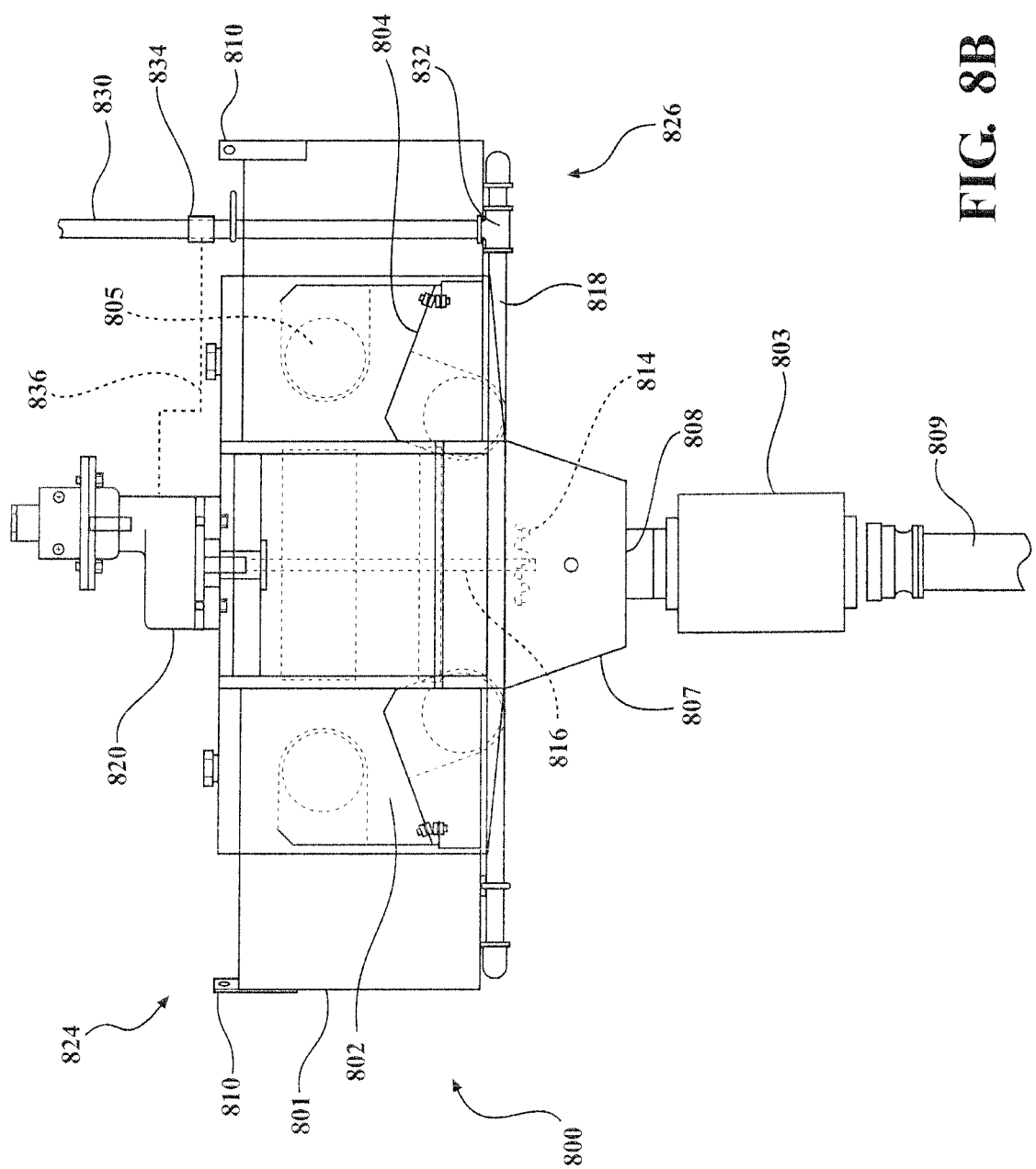
FIG. 8B is a cross-sectional side plan view of the floating weir in accordance with another embodiment of the invention.

Referring now to FIGS. 8A-8B the details and an embodiment of a floating weir 800 for use in any embodiments of the present invention that contemplate using a floating weir is shown and described. The floating weir 800 is connectable to a suction hose 809 having an isolation valve 803. The floating weir 800 has a suction box 802, which is an area of the floating weir that collects the animal byproduct from the tank or environment that the floating weir 800 is placed within. The suction box 802 has four hinged doors 804, 804', 804", 804''' that each have a float member 805 attached to the back side of each hinged door for controlling the opening and closing of the door. The float members 805 float on the surface of the liquid contained within the suction box 802 in order to control the position of the hinged door 804, 804', 804", 804''' between the open position and closed position. This in turn controls the ingress of liquid mixture from the tank into the suction box 802. When the liquid mixture levels in the suction box 802 are low the hinged door 804, 804', 804", 804''' will be more open and when the liquid mixture levels in the suction box 802 are high the hinged door 804, 804', 804", 804''' will be more closed.

The floating weir 800 has floatation regions 812 that are formed in a housing 801 of the floating weir 800. The flotation regions 812 can take many forms, such as for example regions of buoyant material or air chambers formed in the housing, that make the floating weir buoyant and enable the floating weir 800 to float on top of the surface of the liquid that the floating weir 800 is placed within. The suction box 802 has an outlet 408 located below the suction box 802. There is a conical portion 807 between the suction box 802 and the outlet 808 that reduces the volume of liquid mixture between the suction box 802 and the outlet 808, which assists in constricting or throttling the liquid mixture prior to being sucked through the outlet 808. Also the conical portion 807 helps to stabilize the buoyancy of the floating weir 800 by creating a ballast weight located below flotation regions 812 of the floating weir 800. Additional weight can be added to the inside surface or outside surface of the conical section 807 to further create ballast in order to prevent the floating weir 800 from tipping over. While the conical section 807 is shown and described in the present embodiment, it is within the scope of this invention for the conical section 807 to take some other shape or to not be present between the suction box 802 and outlet 808.

The suction or suction hose 809 includes an isolation valve 803 which has a fitting designed to fit over the outer surface or a ribbed nozzle of the outlet 808. The isolation valve allows for easy priming of the floating weir 800 during startup. The ribbed nozzle has rips or raised bumps formed on the outer surface that can also include rubber seals for frictional engagement with the isolation valve 803. The floating weir 800 also includes a lifting eyelets 810 positioned at the top of the housing 801 for removing the floating weir 800 from the tank that the floating weir is placed within.

One problem that can occur is that when large pieces of fat, skin or other portions of an animal that drain into the sump 112 become lodged in the vacuum or suction hose 809. It is therefore desirable to prevent such large masses from moving into the suction hose 809 or risk failure of the sump mixture treatment system 700.

In order to prevent failure the floating weir 800 has one or more chopping blades 814 that are fixed to a shaft 816 and rotate. The shaft 816 has an end that terminates within and positions the one or more chopping blades 814 in the conical portion 807 of the floating weir 800. The shaft 816 extends through the suction box 802 and extends above the outer surface of the suction box and is connected to by way of a coupling, or extends into an air motor 820. The air motor 820 is connected to an air hose that drives the air motor 820 to rotate the shaft 816, which in turn rotates the one or more chopping blades 814. When the one or more chopping blades 814 rotate, any mass of material that is agglomerated within the suction box 802 and the conical portion 807 are chopped and or broken up through agitation of the liquid, prior to moving through the outlet 818 and into the suction hose 809. Chopping up or agitating any masses of animal byproducts within the suction box 802 and conical portion 807 helps to prevent the formation of blockages in the floating weir 800 and downstream within the suction hose 809.

In another aspect of the invention shown in FIGS. 8A and 8B, the floating weir 800 optionally has an air frame 818 attached to and extending around a housing 801 of the floating weir 800. While the air frame 818 is shown to be extending just under each of four corners 820 the entire housing 801 it is within the scope of this invention for the air frame 818 to not completely extend around the housing 801. The air frame 818 has a hollow channel configured to allow air to pass through the air frame 818 and exit a plurality of apertures 606 on an external surface of the air frame 818. The plurality of apertures 822 can be on any surface and are shown facing on a top side surface 824 of the housing 801, but can also face a bottom side 826. In the embodiment shown the air frame 818 has one or more clamps 828, more specifically four clamps 828 are shown. The clamps 828 are used to connect the air frame 818 to the housing 801. The clamps 828 are connected directly to the air frame 818 by welding. In another aspect of the invention the clamps 828 or fasteners that grasp and hold the air frame 818 can easily be removed for applications where the air frame 818 is not necessary or if the air frame 818 becomes damaged and needs to be replaced.

The air frame 818 has a vertical line 830 coupled to a T connection 832 that extends upward from the bottom side 826 to the top side 824 of the floating weir 800. The vertical line 830 terminates at an inlet coupling 834 that is connected to the air source 820, such as an airline or hose. The air supply source can be separate from the air hose 836 that drives the chopping blades of the weir. However, it is also within the scope of this invention for the inlet coupling 834 of the air frame 818 to be connected to a conduit on the motor portion 820 that drives the chopping blades 814, thereby allowing the air frame 818 to receive air from the same air hose as the motor 820 of the chopping weir blades.

While the vertical line 830 is shown extending from the bottom side 826 to the top side 810 it is within the scope of this invention for other connections to be made, for example the inlet coupling 834 can be connected directly to the T connection with the air source being connected at the bottom side 826 of the floating weir 800.

The plurality of holes 822 on the air frame 818 allow air bubbles to pass through the air frame 818 from the hollow channel, thereby causing the water surface adjacent the inlet doors 804 and the water inside the housing to be turbid when compressed air passes through the plurality of holes 822. This agitates the animal by-product masses prior to being pulled into the chopping blades 814 and assists in breaking up larger agglomerates.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for recovery of animal byproducts from an animal processing plant waste stream comprising:
    an equalization tank forming part of the animal processing plant and being connected to one or more water mixture sources, the equalization tank having a first section, a second section and a separation wall separating the first section and second section;
    an inlet of the equalization tank for inputting a water mixture containing particles of animal byproduct, supplied to the first section of the equalization tank, wherein as the level of the water mixture reaches the top of the separation wall a portion of the water mixture will flow over the top of the separation wall and flow into the second section of the equalization tank;
    a moving autoweir located in the second section of the equalization tank and capable of moving vertically within the second section so that a body portion of the moving autoweir stays about at a surface level of the water mixture within the second section in order to collect and remove a portion of the water mixture and particles of animal byproduct that are less dense than water which are more concentrated at the surface level of the water mixture within the second section;
    one or more inlet doors formed in the body of the moving autoweir each of the one or more inlet doors will open when positioned at or above the surface level of the water mixture within the second section and will close when positioned below the surface level of the water mixture within the second section;
    a suction outlet connected to the body of the moving autoweir for removing the water mixture that enters the body of the moving autoweir through the one or more inlet doors;
    a vertical separation tank having an inlet connected to and receiving the water mixture from the suction outlet;
    one or more aeration inlets connected to the separation tank at locations beneath the surface of the mixture contained within the separation tank, wherein the one or more aeration inlets apply a steady stream of air bubbles to the water mixture in order to promote the separation of particles of animal byproduct that are less dense than water, by promoting the particles of animal byproduct that are less dense than water to float to the surface of the water mixture contained within the vertical separation tank thereby creating a surface layer of concentrated animal byproduct mixture with water;
    a scraper having one or more blades located above the surface of the water mixture within the separation tank, where in the one or more blades move parallel to the surface of the water mixture in order to push the concentrated animal byproduct mixture with water to a sludge chute;
    a holding tank for receiving the concentrated animal byproduct mixture with water from the sludge chute;
    an air tube connected to the outside surface of the moving autoweir, wherein the air tube has a first end positioned in the water mixture and a second end connected to an air source, and
    a hydrostatic pressure sensor connected to the air tube, wherein the hydrostatic pressure sensor determines the position of the open end of the first end of the air tube relative to the surface level of the water mixture.

2. The system of claim 1 further comprising:
    one or more sump tanks with the animal processing plant and having a water mixture source connected to each one of the one or more sump tanks;
    one or more floating weirs contained in each one of the one or more sump tanks, wherein each one of the one or more floating weirs is connected to a supply line that connects to the inlet of the equalization tank.

3. The system of claim 1 further comprising a motor actuator connected to a body of the moving autoweir for move the moving autoweir to a vertical height within the equalization tank.

4. The system of claim 1 wherein the equalization tank receives water mixture from one or more sumps connected to a killing station, skin removal station, processing station and edible offal and tripe station within an animal processing plant.

5. The system of claim 1 wherein no chemicals are added to the water mixture in the equalization tank.

6. The system of claim 1 further comprising a dissolved air flotation arrangement connected to the inlet of the vertical separation tank, wherein the dissolved air flotation unit includes a pump for injecting microbubbles into the water mixture, therein the microbubbles adhere to small particles of animal byproduct and cause the small particles of animal byproduct to float on the surface of the water mixture in the vertical separation tank.

7. The system of claim 1 wherein the one or more aeration inlets include a lower aeration inlet and an upper aeration inlet each independently controlled and connected to a compressed air source, wherein the lower aeration inlet injects bubbles near a bottom surface of the vertical separation tank to cause solids at the bottom of the separation tank to mix with the water mixture and the upper aeration inlet that injects bubbles that move up the side of the vertical separation tank and induce a current that causes the surface layer of concentrated animal byproduct mixture to move toward the sludge chute.

8. The system of claim 1 further comprising with an aeration screen located at the top side of the separation wall where the water mixture flowing over the separation wall will pass through the aeration screen, thereby aerating the water mixture to cause the separation of animal byproducts from the water in the water mixture.

* * * * *